US 9,403,458 B2

(12) United States Patent
Jeong

(10) Patent No.: US 9,403,458 B2
(45) Date of Patent: Aug. 2, 2016

(54) HEADREST MOVING DEVICE

(71) Applicant: WOOBO TECH CO., LTD., Pyeongtaek-si, Gyeonggi-do (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 41 days.

(21) Appl. No.: 14/403,825

(22) PCT Filed: Feb. 19, 2014

(86) PCT No.: PCT/KR2014/001338
§ 371 (c)(1),
(2) Date: Nov. 25, 2014

(87) PCT Pub. No.: WO2014/129798
PCT Pub. Date: Aug. 28, 2014

(65) Prior Publication Data
US 2015/0145310 A1    May 28, 2015

(30) Foreign Application Priority Data

Feb. 20, 2013    (KR) .......................... 10-2013-0018069

(51) Int. Cl.
*A47C 1/10*    (2006.01)
*B60N 2/48*    (2006.01)

(52) U.S. Cl.
CPC ............ *B60N 2/4814* (2013.01); *B60N 2/4817* (2013.01); *B60N 2/4844* (2013.01); *B60N 2/4864* (2013.01); *B60N 2002/4894* (2013.01)

(58) Field of Classification Search
CPC .. B60N 2/4814; B60N 2/4817; B60N 2/4844; B60N 2/4864; B60N 2002/4894

USPC .......................... 297/391, 406, 409, 408, 410
See application file for complete search history.

(56) References Cited

U.S. PATENT DOCUMENTS

| 4,191,422 A * | 3/1980 | Inasawa ............... B60N 2/4864 297/391 |
| 4,265,482 A | 5/1981 | Nishimura et al. ........... 297/391 |

(Continued)

FOREIGN PATENT DOCUMENTS

| JP | 2000-083756 | 3/2000 | ............... A47C 7/38 |
| KR | 10-2009-0065725 | 6/2009 | ............... B60N 2/48 |

(Continued)

*Primary Examiner* — Laurie K Cranmer
(74) *Attorney, Agent, or Firm* — Sunstein Kann Murphy & Timbers LLP

(57) ABSTRACT

Disclosed is a headrest moving device. The headrest moving device includes: a cover including a front wall and a rear wall a middle cover disposed inside the cover and formed with a hollow portion; a locking cover inserted into the hollow portion, connected to the cover, and formed with teeth along a forward/backward direction thereof; a lock pin plate installed on the middle cover to be slidable in a leftward/rightward direction and provided with a lock pin inserted into the teeth; a lock plate formed with through-holes through which vertical portions of a stay rod pass, the lock plate being installed on the middle cover to be slidable in the leftward/rightward direction and being connected to the lock pin plate; a return spring configured to return the lock plate or the lock pin plate; and a button configured to move the lock plate in the leftward/rightward direction. The cover is formed in an integrated body so that the spacing between the front wall and the rear wall may be maintained constantly.

11 Claims, 12 Drawing Sheets

(56) References Cited

U.S. PATENT DOCUMENTS

| | | | |
|---|---|---|---|
| 5,711,579 A | 1/1998 | Albrecht | 297/410 |
| 6,068,337 A | 5/2000 | De Filippo | 297/391 |
| 6,302,485 B1 | 10/2001 | Nakane et al. | 297/408 |
| 6,880,890 B1 | 4/2005 | DeBrabant | 297/408 |
| 6,910,740 B2 | 6/2005 | Baker et al. | 297/408 |
| 7,267,407 B1 | 9/2007 | Demick et al. | 297/410 |
| 7,306,287 B2 | 12/2007 | Linardi et al. | 297/410 |
| 7,322,646 B2 | 1/2008 | Jammalamadaka et al. | 297/216.12 |
| 7,621,598 B2 | 11/2009 | Humer et al. | 297/410 |
| 7,631,932 B2 * | 12/2009 | Hoffmann | B60N 2/4885 297/216.12 |
| 7,669,932 B1 | 3/2010 | Grönninger et al. | 297/408 |
| 7,758,126 B2 | 7/2010 | Haase | 297/408 |
| 7,871,129 B2 * | 1/2011 | Boes | B60N 2/4814 297/404 |
| 7,954,899 B2 * | 6/2011 | Chen | B60N 2/4808 297/391 |
| 8,038,219 B2 * | 10/2011 | Boes | B60N 2/4885 297/406 |
| 8,297,705 B2 * | 10/2012 | Brunner | B60N 2/4814 297/410 |
| 8,376,465 B2 * | 2/2013 | Veine | B60N 2/4817 297/410 |
| 8,641,148 B2 * | 2/2014 | Fey | B60N 2/4814 297/391 |
| 8,950,815 B2 * | 2/2015 | Wang | B60N 2/4864 297/391 |
| 9,126,513 B2 * | 9/2015 | Jeong | B60N 2/4814 |
| 2011/0148171 A1 | 6/2011 | Charles et al. | 297/410 |
| 2012/0080926 A1 * | 4/2012 | Fey | B60N 2/4864 297/410 |
| 2014/0001811 A1 * | 1/2014 | Haeske | B60N 2/4823 297/409 |

FOREIGN PATENT DOCUMENTS

| | | | | |
|---|---|---|---|---|
| KR | 10-2011-0026180 | | 3/2011 | B60N 2/48 |
| KR | 10-1231013 | | 2/2013 | B60N 2/48 |
| KR | 20130061329 A | * | 6/2013 | B60N 2/4814 |

* cited by examiner (a)   (b)   (c)

(a')   (b')   (c')

(a)  (b)  (c)

HEADREST MOVING DEVICE

TECHNICAL FIELD

The present invention relates to a headrest moving device, and particularly to a headrest moving device in which a position in a forward/backward direction and a position in an upward/downward direction may be adjusted through a pushing action of a single button with a simple structure, a spacing between a front wall and a rear wall is maintained constantly so that a gap and play of the device may be minimized, and the device is simple in structure so that assemblability may be improved and the manufacturing costs may be reduced.

BACKGROUND ART

U.S. Pat. Nos. 6,302,485, 7,322,646, 7,669,932, and 7,758,126 disclose a headrest which is folded when a single button is pushed. U.S. Pat. Nos. 6,302,485, 7,322,646, 7,669,932, and 7,758,126 have a problem in that the vertical height of the headrest cannot be adjusted using a button that folds the headrest.

U.S. Pat. Nos. 6,880,890 and 6,910,740 disclose a headrest which, when a button is pushed, is rotated so that an inclination of the headrest is adjusted. U.S. Pat. Nos. 6,880,890 and 6,910,740 have a problem in that the vertical height of the headrest cannot be adjusted using a button that adjusts a forward/backward angle.

U.S. Pat. Nos. 6,068,337, 7,306,287, 7,621,598, and 5,711,579 and U.S. Laid-Open Patent No. 2011-0148171 disclose a headrest of which a vertical height is adjusted when a button is pushed. U.S. Pat. Nos. 6,068,337, 7,306,287, 7,621,598, and 5,711,579 and U.S. Laid-Open Patent No. 2011-0148171 have a problem in that a position of the headrest in a forward/backward direction cannot be adjusted through a vertical height adjusting button.

U.S. Pat. No. 4,265,482 discloses a headrest of which a forward/backward position is adjusted when a button is pushed. U.S. Pat. No. 4,265,482 has a problem in that the vertical height of the headrest cannot be adjusted through a forward/backward position adjusting button.

U.S. Patent Laid-Open Publication No. 2012-80926 discloses a configuration capable of moving a headrest upward/downward and forward/backward using a single button. U.S. Patent Laid-Open Publication No. 2012-80926 makes the headrest movable forward/backward by deforming a leaf spring interlocked with the lock plate to release locking. The U.S. Laid-Open Patent Publication No. 2012-80926 has a problem in that since the internal structure of the headrest is complicated, the assemblability is poor and the price of a product is increased.

U.S. Pat. No. 7,267,407 discloses a structure which includes a bottom cover having a shape corresponding to a bottom opening, and a ratchet assembly disposed between the bottom cover and the headrest such that the height of the headrest is adjusted by moving a ratchet post in a locking direction or a locking releasing direction. The ratchet assembly includes a bottom portion that operates the latchet assembly, the bottom cover includes a bezel unit that surrounds the bottom portion and disposed outside the headrest, the bottom portion is positioned below an outer surface of the headrest, and the height adjusting device is disposed outside the headrest.

In a headrest of Korean Patent Application No. 2011-0089135 (not published), a middle cover that is formed with a hollow portion, a lock pin that passes through the hollow portion, a rear plate that penetrates the hollow portion, and a lock plate that is positioned to be movable leftward/rightward are disposed within a cover of the headrest and the headrest is provided with a button that presses the lock plate. In Korean Patent Application No. 2011-0089135, an adjusting device that adjusts a height and a forward/backward position of the headrest is disposed inside the headrest, and the middle cover is not formed with a bezel unit that encloses the lock plate and is disposed outside the middle cover, by which Korean Patent Application No. 2011-0089135 is differentiated from U.S. Pat. No. 7,267,407.

However, the headrest of Korean Patent Application No. 2011-0089135 has problems in that the front cover is installed to be movable forward/backward in relation to the rear cover to generate a gap in the device, and a link structure is used thereby making the structure complicated, deteriorating the assemblability, and increasing the price of a product. In addition, in Korean Patent Application No. 2011-0089135, since teeth are formed integrally with the front cover, the front cover and the teeth should be formed of the same material. As a result, the weight of the device is increased and a fastening force is poor.

DISCLOSURE OF INVENTION

Technical Problem

The present invention has been conceived so as to solve the problems as described above and an object of the present invention is to provide a headrest moving device in which a gap and play of the device may be minimized and the structure is simplified to improve the assemblability and reduce the manufacturing costs.

Solution to Problem

In order to achieve the above-described objects, there is provided a headrest moving device including: a cover including a front wall and a rear wall a middle cover disposed inside the cover and formed with a hollow portion; a locking cover inserted into the hollow portion, connected to the cover, and formed with teeth along a forward/backward direction thereof; a lock pin plate installed on the middle cover to be slidable in a leftward/rightward direction and provided with a lock pin inserted into the teeth; a lock plate formed with through-holes through which vertical portions of a stay rod pass, the lock plate being installed on the middle cover to be slidable in the leftward/rightward direction and being connected to the lock pin plate; a return spring configured to return the lock plate or the lock pin plate; and a button configured to move the lock plate in the leftward/rightward direction. The cover is formed in an integrated body so that the spacing between the front wall and the rear wall may be maintained constantly.

The cover includes a front cover and a rear cover disposed at a rear side of the front cover and the front cover is fixed to the rear cover. The middle cover is provided with a ball bearing such that the ball bearing encloses the locking cover. The button includes a button unit and a bezel unit in which the button unit is slidably mounted. The middle cover is formed with vertical portion passing holes into which the vertical portions are inserted, and bushing elements are inserted into the vertical portion passing holes such that the bushing elements are disposed between the middle cover and the vertical portions. At a lower portion of the middle cover, a lock pin plate insertion hole is formed in which the lock pin plate is inserted into the lock pin plate insertion hole and the lock pin plate insertion hole is communicated with the hollow portion.

The lock pin plate is formed with a linkage protrusion, the lock plate is formed with a lock protrusion passing hole through which the linkage protrusion passes, and a bottom cover configured to support the lock plate is mounted on the middle cover.

Advantageous Effects of Invention

According to the headrest moving device of the present invention, the following effects may be achieved.

The headrest moving device includes: a cover including a front wall and a rear wall; a middle cover disposed inside the cover and formed with a hollow portion; a locking cover inserted into the hollow portion, connected to the cover, and formed with teeth along a forward/backward direction thereof; a lock pin plate installed on the middle cover to be slidable in a leftward/rightward direction and provided with a lock pin inserted into the teeth; a lock plate formed with through-holes through which vertical portions of a stay rod pass, the lock plate being installed on the middle cover to be slidable in the leftward/rightward direction and being connected to the lock pin plate; a return spring configured to return the lock plate or the lock pin plate; and a button configured to move the lock plate in the leftward/rightward direction. Thus, the forward/backward position and the upward/downward position may be adjusted through the single button, thereby improving the user's convenience. The cover is formed in an integrated body so that the spacing between the front wall and the rear wall may be maintained constantly. As a result, the gap and play of the device may be minimized. Further, since the device is simple in construction, the assemblability may be improved and the manufacturing costs may be reduced.

The cover includes a front cover and a rear cover disposed at a rear side of the front cover and the front cover is fixed to the rear cover. As a result, the assembly process may be easily performed.

The middle cover is provided with a ball bearing such that the ball bearing encloses the locking cover. Thus, the locking cover may be smoothly moved forward/backward in relation to the middle cover.

The first insulator members are disposed between the front wall and the rear wall, and the third insulator members are disposed between the middle cover and the lock plate. Thus, occurrence of noise or damage of an element may be prevented even when the cover and the middle cover or the stay rod are struck in the course of moving the headrest.

The button includes a button unit and a bezel unit in which the button unit is slidably mounted. In addition, serrations are formed on an inner wall of the bezel unit. Thus, friction between the button unit and the bezel unit is reduced. As a result, an operation force required to press the button unit may be reduced thereby improving the user s convenience.

The middle cover is formed with passing holes into which the vertical portions are inserted, and bushing elements are inserted into the vertical portion passing holes such that the bushing elements are disposed between the middle cover and the vertical portions. Thus, the middle cover may be smoothly moved vertically in relation to the vertical portions. As a result, operating noise and friction may be reduced.

At a lower portion of the middle cover, a lock pin plate insertion hole is formed in which the lock pin plate is inserted into the lock pin plate insertion hole and the lock pin plate insertion hole is communicated with the hollow portion. The lock pin plate is formed with a linkage protrusion and the lock plate is formed with a lock protrusion passing hole through which the linkage protrusion passes. In addition, a bottom cover configured to support the lock plate is mounted on the middle cover. As a result, the lock pin plate and the lock plate may be easily assembled with the middle cover.

In addition, the headrest moving device further includes a lower cover configured to enclose the opposite side portions and the bottom portion of the cover and the button is installed in the lower cover. As a result, the headrest moving device may be assembled more easily.

BRIEF DESCRIPTION OF DRAWINGS

FIGS. 23a, 23b, 23c, 23a', 23b', and 23c' are cross-sectional views illustrating a forward/backward operating state of a headrest moving device according to an exemplary embodiment of the present invention in which FIGS. 23a to 23c are taken by cutting horizontally the locking cover part and FIGS. 23a' to 24c' are taken by cutting vertically the locking cover FIGS. 25a to 25c are views illustrating a state in which a headrest moving device according to an exemplary embodiment of the present invention is moved vertically in which FIGS. 25a to 25c are taken by cutting vertically the lock plate and a bushing element is omitted from the figures.

MODE FOR THE INVENTION

Figure 1:
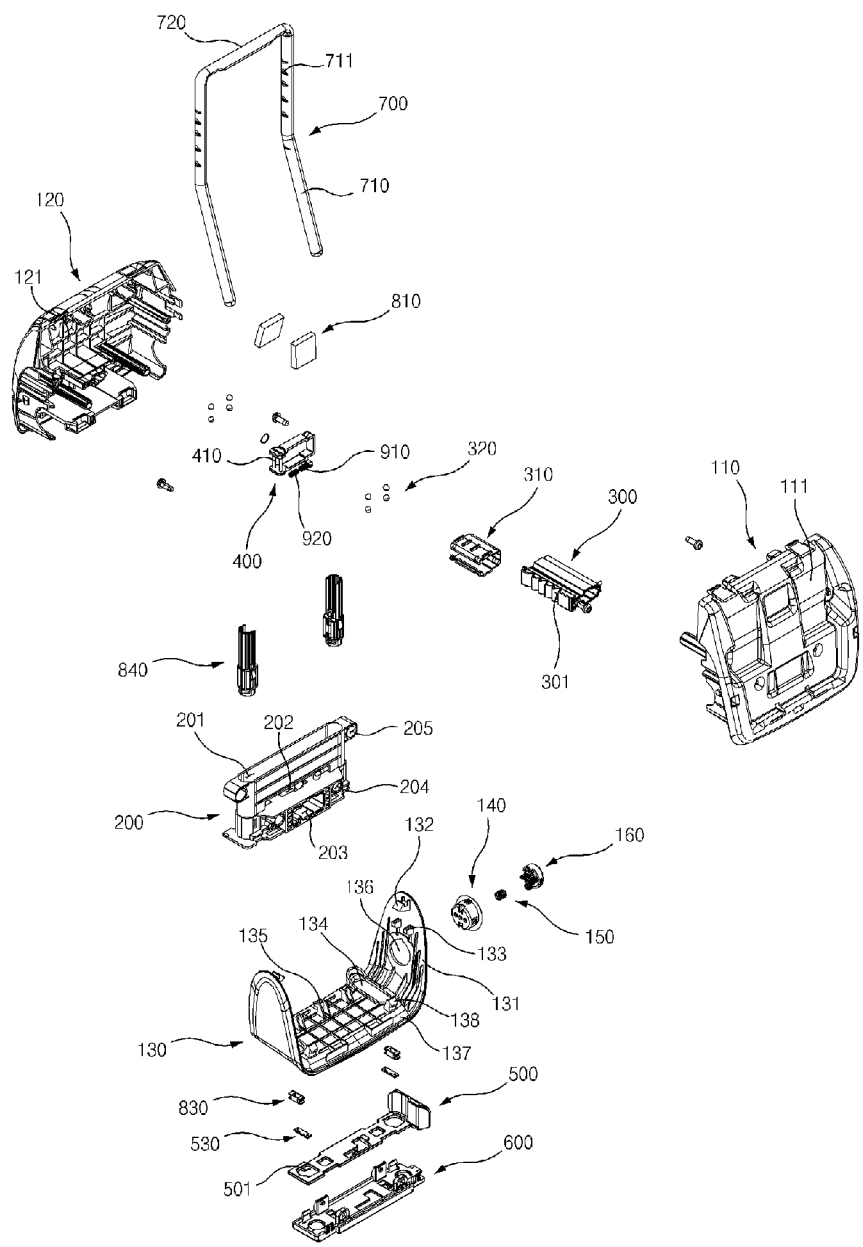
FIG. 1 is an exploded perspective view of a headrest moving device according to an exemplary embodiment of the present invention
Figure 2:
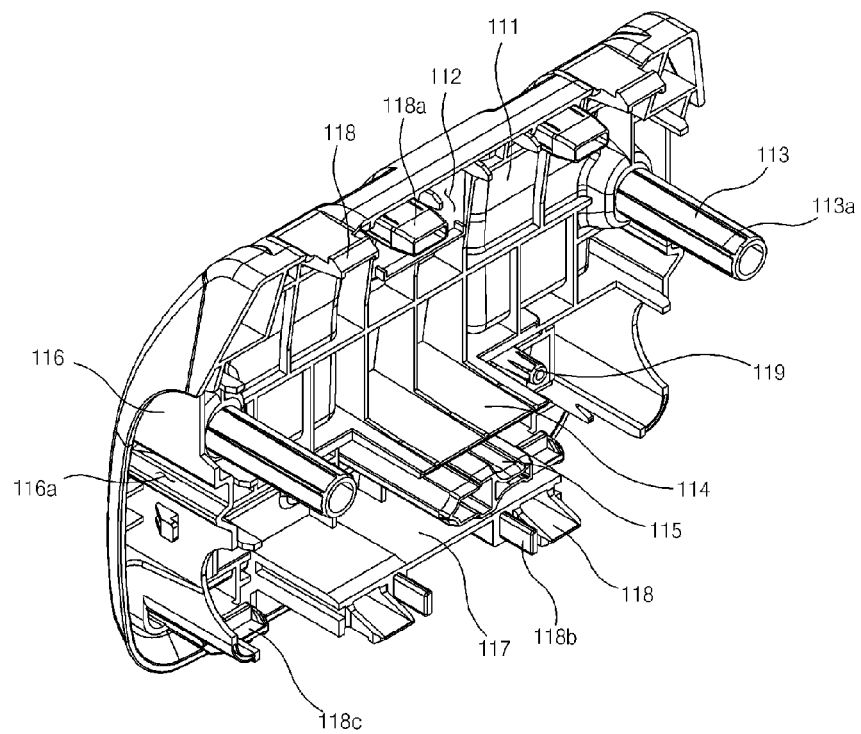
FIG. 2 is a rear side perspective view of a front cover illustrated in FIG. 1
Figure 3:
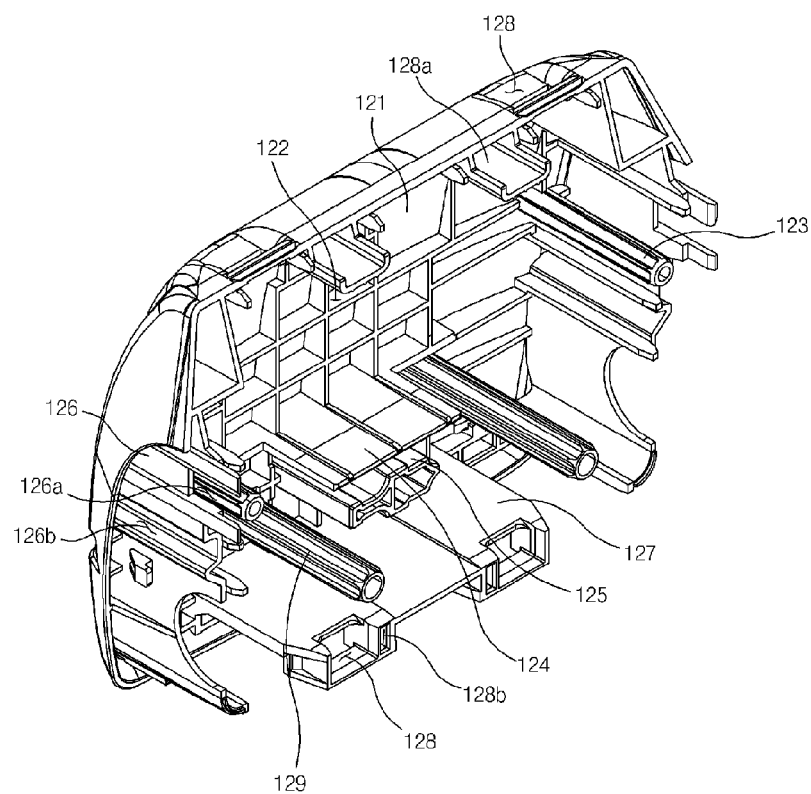
FIG. 3 is a perspective view of a rear cover illustrated in FIG. 1.
Figure 4:
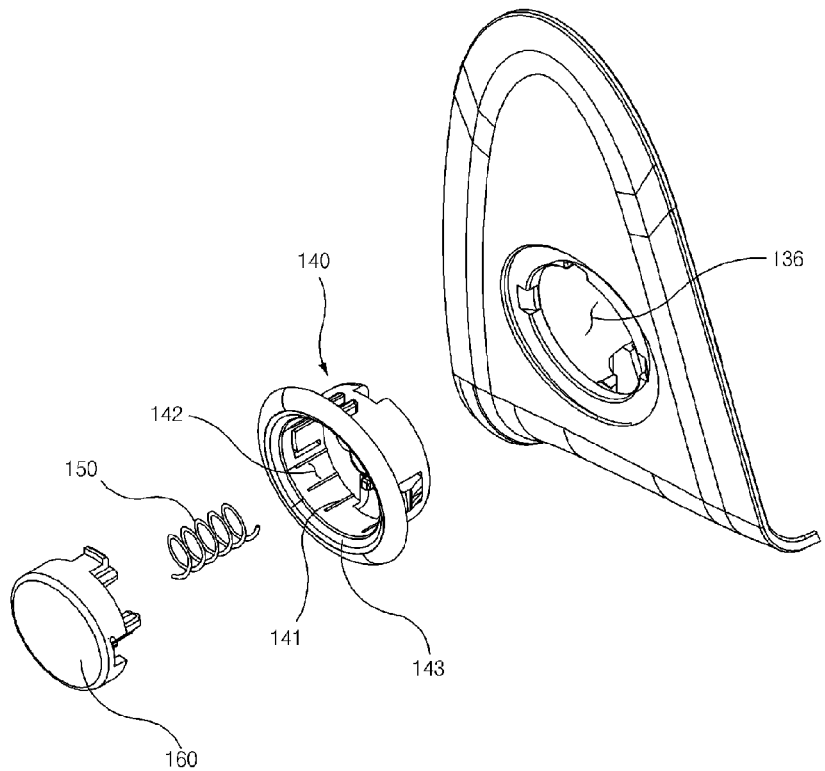
FIG. 4 is an exploded perspective view of a button illustrated in FIG. 1
Figure 5:
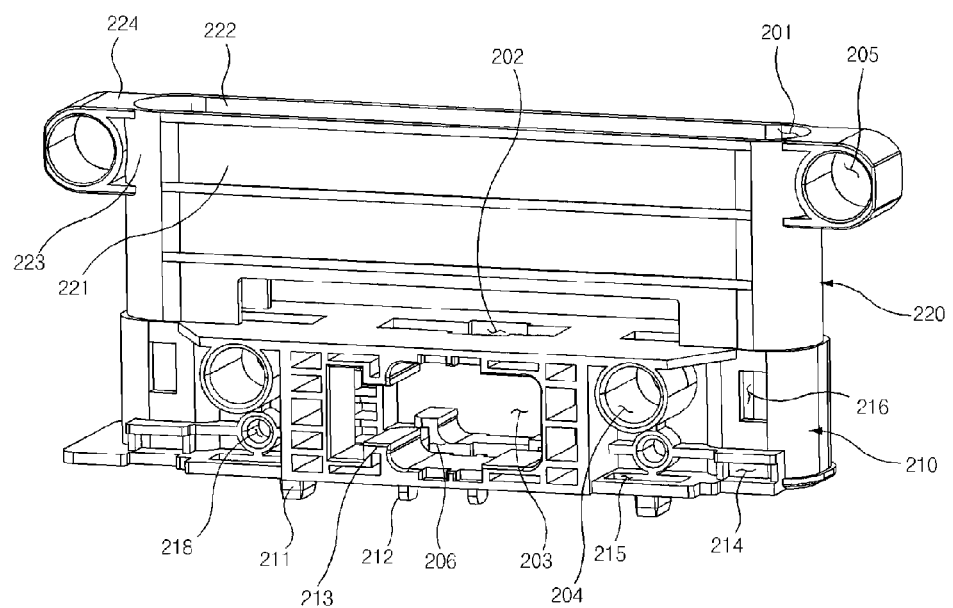
FIG. 5 is a perspective view of a middle cover illustrated in FIG. 1
Figure 6:
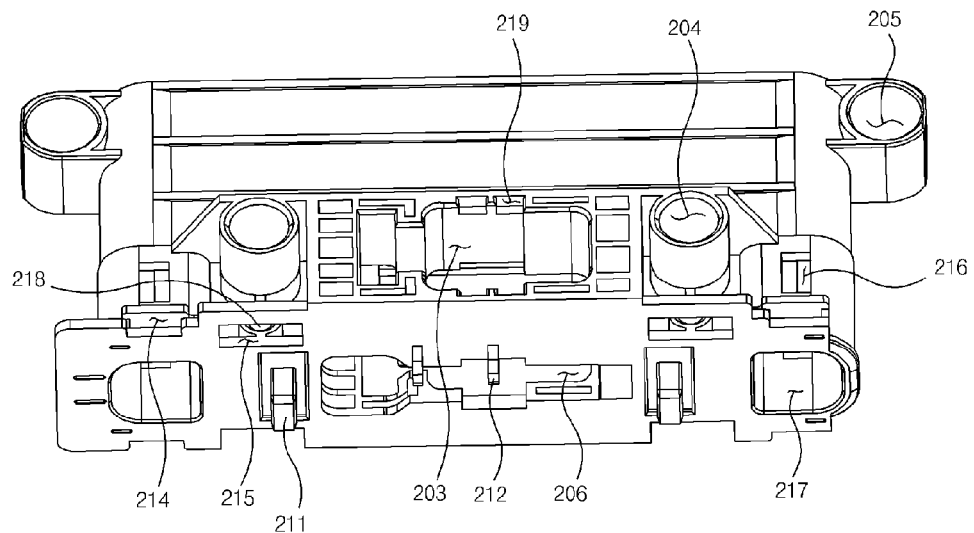
FIG. 6 is a bottom side perspective view of the middle cover illustrated in FIG. 1
Figure 7:
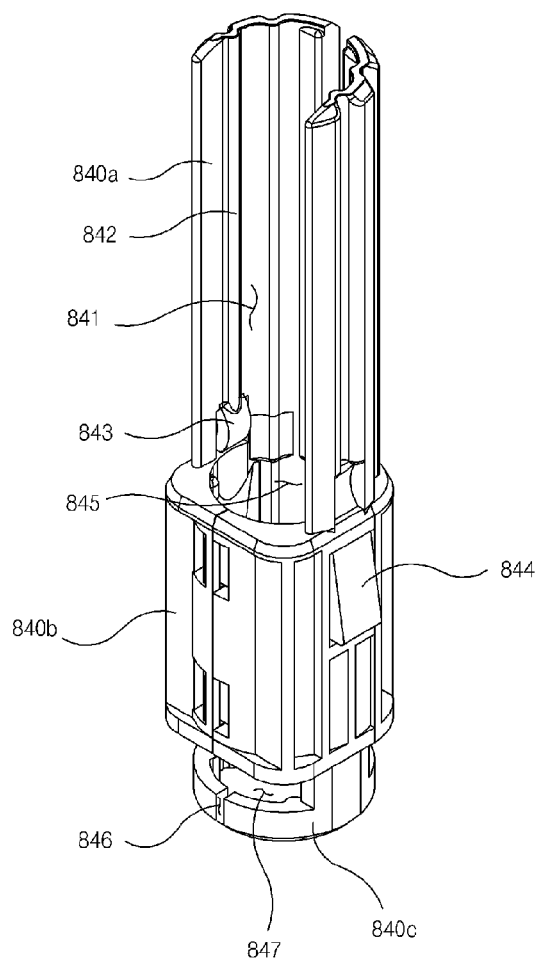
FIG. 7 is a perspective view of a bushing element illustrated in FIG. 1
Figure 8:
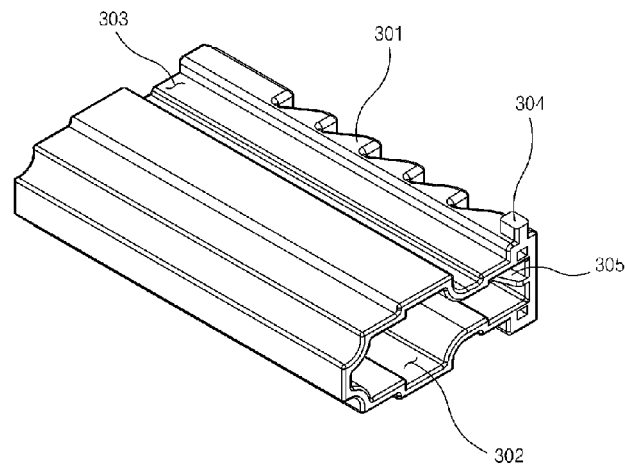
FIG. 8 is a perspective view of a locking cover illustrated in FIG. 1
Figure 9:
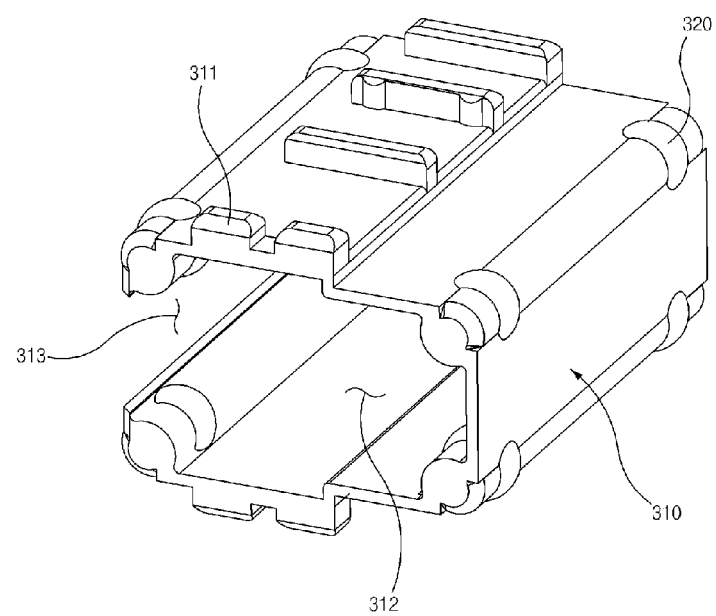
FIG. 9 is a perspective view of a ball bearing and a bearing cover illustrated in FIG. 1
Figure 10:
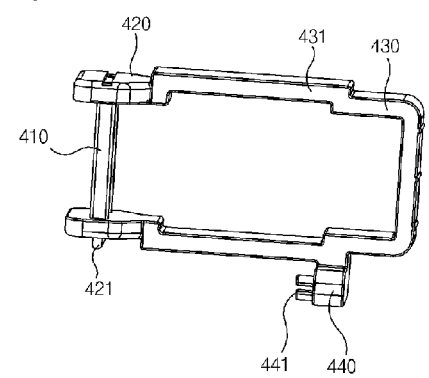
FIG. 10 is a perspective view of a lock pin plate illustrated in FIG. 1.
Figure 11:
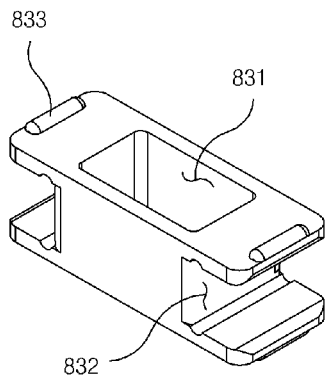
FIG. 11 is a perspective view of a third insulator member illustrated in FIG. 1
Figure 12:
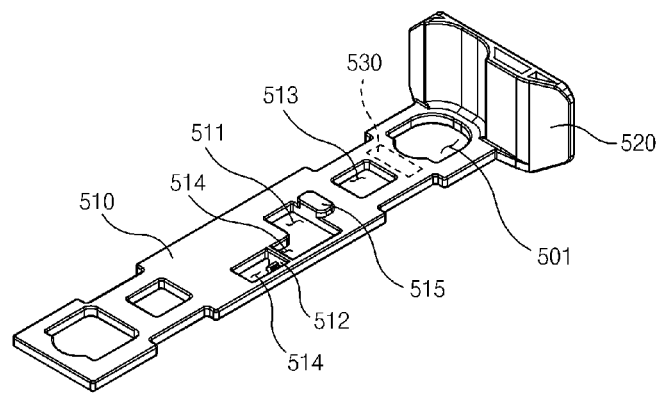
FIG. 12 is a perspective view of a lock plate illustrated in FIG. 1.
Figure 13:
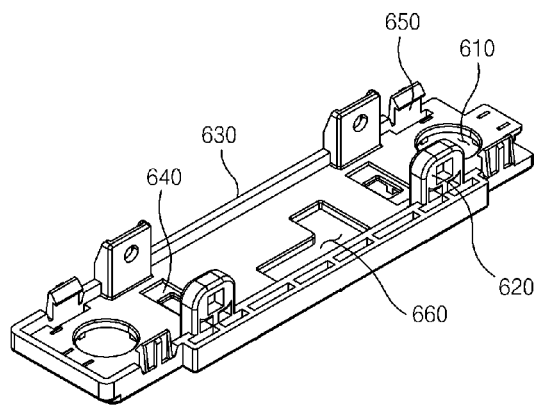
FIG. 13 is a perspective view of a bottom cover illustrated in FIG. 1.
Figure 14:
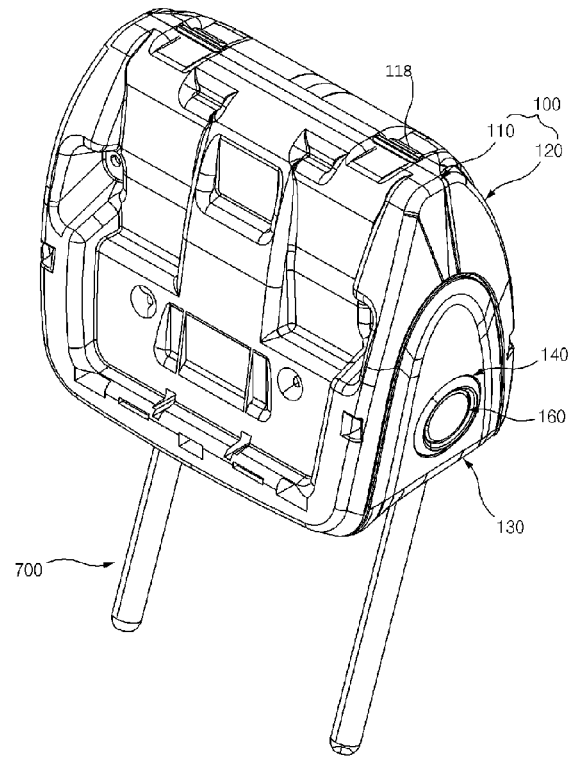
FIG. 14 is a perspective view of the headrest moving device of FIG. 1 in the assembled state.

Hereinbelow, exemplary embodiments will be described in detail with reference to the present invention.

For reference, components of the present invention which are the same as those of the prior art as described above will not be described separately while referring to the prior art described above.

As illustrated in FIGS. 1 to 25, a headrest moving device of an exemplary embodiment includes: a cover 100 including a front wall 111 and a rear wall 121 a middle cover 200 disposed inside the cover 100 and formed with a hollow portion 203 a locking cover 300 inserted into the hollow portion 203, connected to the cover 100 and formed with teeth 301 along a forward/backward direction thereof; a lock pin plate 400 installed on the middle cover 200 to be slidable in a leftward/rightward direction and provided with a lock pin 410 inserted into the teeth 301; a lock plate 500 formed with through-holes 501 through which vertical portions 710 of a stay rod 700 are inserted, the lock plate 500 being installed on the middle cover 200 to be slidable in the leftward/rightward direction and being connected to the lock pin plate 400 a return spring 900 configured to return the lock plate 500 or the lock pin plate 400 and a button configured to move the lock plate 500 in the leftward/rightward direction, in which the cover 100 is formed in an integrated body so that the spacing between the front wall 111 and the rear wall 121 may be maintained constantly.

The cover 100 includes the front wall 111 and the rear wall 121.

The cover 100 is formed in an integrated body so that the spacing between the front wall 111 and the rear wall 121 may be maintained constantly.

In the present exemplary embodiment, the cover 100 includes a front cover 110 and a rear cover 120 disposed at the rear side of the front cover 110 in which the front cover 110 is formed to be fixed to and integrated with the rear cover 120.

In addition, the cover 100 further includes a lower cover 130 configured to enclose the opposite side portions and the bottom portion thereof.

The front cover 110 includes front opposite side walls 116 formed at rear opposite sides of the front wall 111 and a front bottom wall 117 formed at the rear lower portion of the front wall 111.

Coupling hooks 118 are formed at upper opposite sides of the front wall 111 and lower opposite sides of the front bottom wall 117 to protrude backwardly.

Coupling guide protrusions 118b are formed inside the coupling hooks 118 formed at the lower opposite sides of the front bottom wall 117 to protrude.

Lower cover catch steps 118c are formed at the rear lower portion of the front wall 111 to be disposed at the opposite sides of the coupling hooks 118.

Each of the front opposite side walls 116 are formed with an insertion groove 116a along a forward/backward direction.

A guide plate 114 is formed at a rear middle portion of the front wall 111 to protrude. A rib is formed on the guide plate 114 along a forward/backward direction to improve the endurance of the guide plate 114.

A locking cover connection portion 115 is formed on the rear side of the front wall 111 to be disposed below the guide plate 114.

A seat recess 112 is formed on the rear side of the front wall 111 and a first insulator member 810 to be described later is seated in the seat recess 112.

Insertion pipe portions 118a are formed at rear upper opposite sides of the front wall 111.

Guide portions 119 are formed on the rear side of the front wall 111 to be disposed at opposite sides below the guide plate 114.

Forward/backward guide rods 113 for fastening are formed at rear opposite sides of the front wall 111 in which bolts for coupling the front cover 110 and the rear cover 120 are fastened. On the outer circumferential surface of each of the forward/backward guide rods 113, forward/backward ribs 113a are formed along the forward/backward direction so that the forward/backward guide rods 113 may be smoothly moved in a state where the forward/backward rods 113 are inserted into guide rod passing holes 205 at the top end of the middle cover 200.

The rear cover 120 includes a rear wall 121, rear opposite walls 126 at the front side of the rear wall 121, and a rear bottom wall 127 formed at the front lower portion of the rear wall 121.

The rear cover 120 is formed with hook fastening holes 128 into which the coupling hooks 118 are inserted.

The rear cover 120 is formed with guide holes 128b into which the coupling guide protrusions 118b are formed.

Lower cover hook fastening holes are formed below the rear bottom wall 127.

The rear opposite walls 126 are formed with insertion grooves 126a which are communicated with the insertion grooves 116a along the forward/backward direction.

The rear opposite side walls 126 are formed with lower cover hook fastening holes 126b.

A guide plate 124 is formed at a front middle portion of the rear wall 121 to protrude.

At the front side of the rear wall 121, a locking cover connection portion 125 is formed to be disposed below the guide plate 124.

On the front surface of the rear wall 121, a seat recess 122 is formed in which the first insulator member 810 is seated in the seat recess 122. Thus, the first insulator member 810 is disposed between the front wall 111 and the rear wall 121. The first insulator member 810 is formed of a sponge material. Accordingly, when the cover 100 is moved forward/backward in relation to the stay rod 700, occurrence of noise or damage of an element may be prevented even when the cover 100 and the stay rod 700 are struck.

Insertion portions 128a are formed at front upper opposite sides of the rear wall 121 in which the insertion pipe portions 118a are inserted into the insertion portions 128a.

Below the insertion pipe portions 118a and the insertion portions 128a, a protrusion having a circular arc-shaped cross section is formed to line-contact with a horizontal portion 720 of the stay rod 700 to be described later.

On the front surface of the rear wall 121, forward/backward guide rods 129 to be fastened to the guide portions 119 are formed to protrude. Ribs are also formed on the outer circumferential surfaces of the forward/backward guide rods 129 to line-contact with the middle cover 200 when the headrest is moved forward/backward so as to minimize friction.

The guide portions 119 and the forward/backward guide portions 129 serve as guides.

On the front surface of the rear wall 121, forward/backward guide rods 123 to be bolt-fastened to the forward/backward guide rods 113 are formed. On the outer circumferential surfaces of the forward/backward guide rods 123, forward/backward ribs are formed along the forward/backward direction.

In addition, front opposite side walls 116 and rear opposite side walls 126 are formed with button passing holes, through which a button to be described below passes.

The lower cover 130 includes side walls 131 disposed outside of the front opposite side walls 116 and the rear opposite side walls 126, and a bottom wall 137 connected to the lower ends of the side walls 131.

At the upper portions of on the inner surfaces of the side walls 131, fastening hooks 132 which are fastened to the lower cover hook fastening holes 126b are formed.

On the inner surface of the side walls 131, protruding pieces 133 inserted into the insertion grooves 116a and 126a are formed below the fastening hooks 132.

At the front and rear portions on the bottom wall 137, lower cover catch steps 118c and fastening hooks 138 and 135 configured to be fastened to the lower cover hook fastening holes are formed.

In the bottom wall 137, elongated holes 134 are formed in the forward/backward direction in which the vertical portions 710 of the stay rod 700 are inserted through the elongated holes 134.

On the bottom wall 137, support steps configured to support the vertical portions 710 are formed to protrude.

One of the side walls 131 is formed with a button passing hole 136 through which the bezel unit 140 of the button passes.

On the one side wall 131, the bezel unit 140 is slidably installed.

Figure 15:
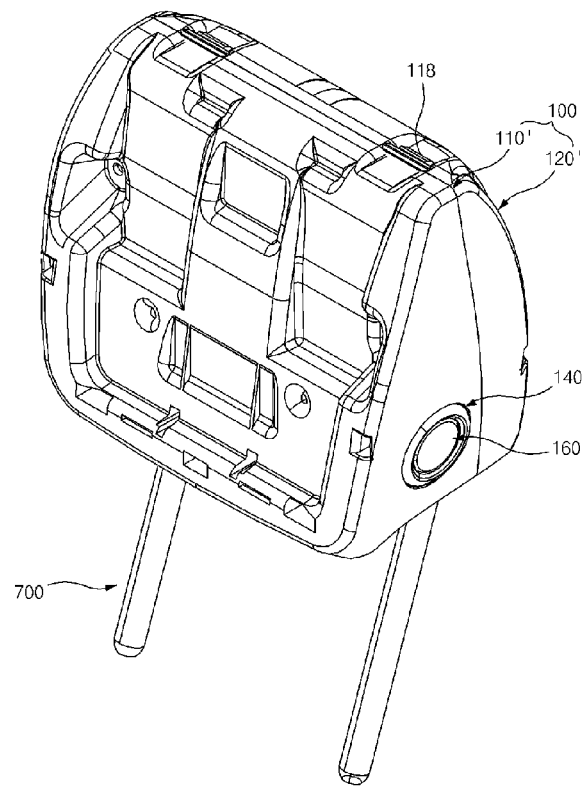
FIG. 15 is a perspective view of a headrest moving device according to another exemplary embodiment of the present invention in the assembled state.
Figure 16:
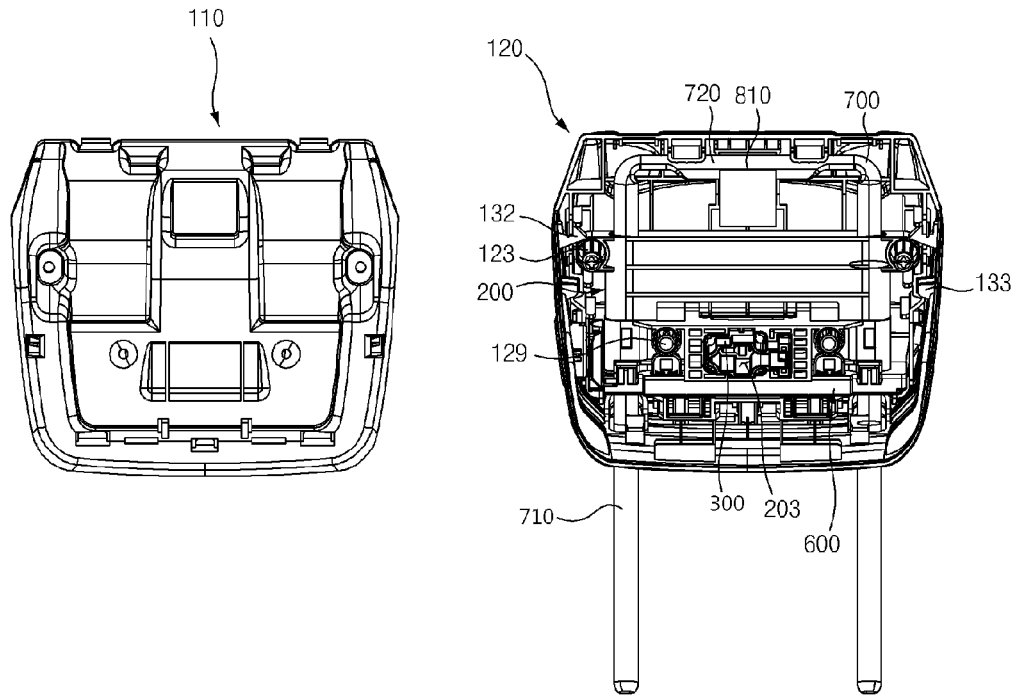
FIG. 16 is a front view of the headrest moving device of FIG. 14 in a state where a front cover is removed therefrom.
Figure 17:
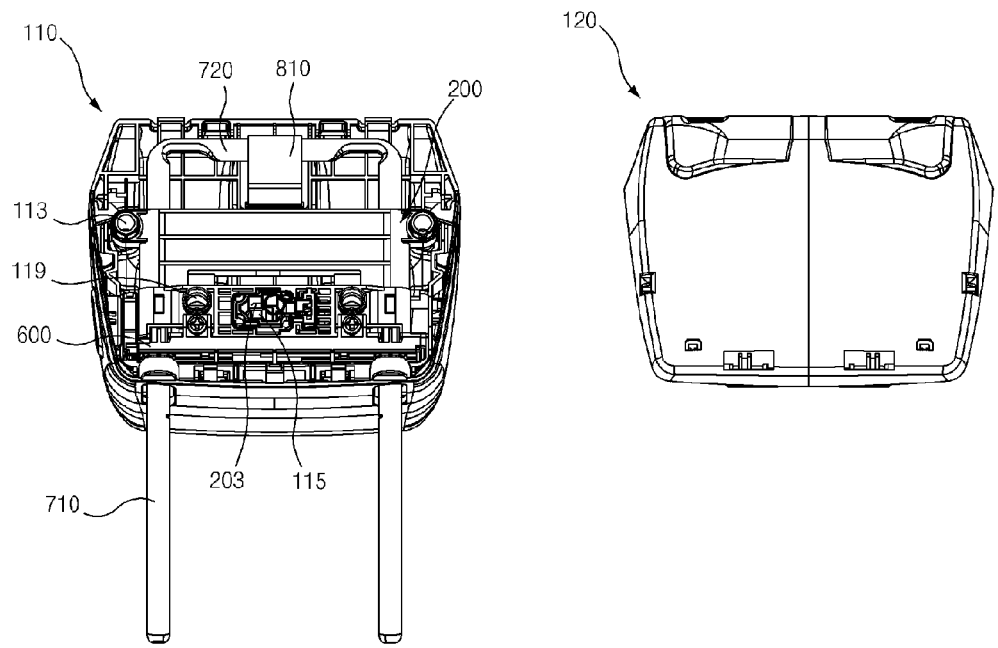
FIG. 17 is a rear view of the headrest moving device of FIG. 14 in a state where a rear cover is removed therefrom.
Figure 18:
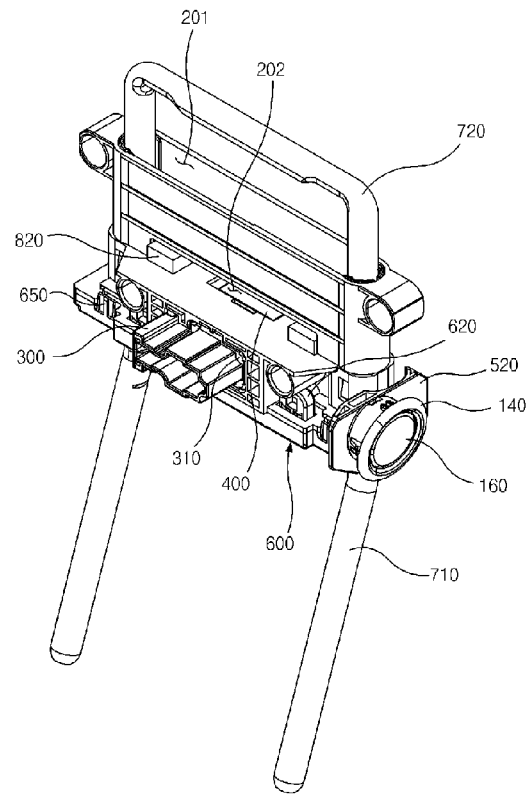
FIG. 18 is a perspective view of the headrest moving device of FIG. 14 in a state where the front, rear and bottom covers are removed therefrom.
Figure 19:
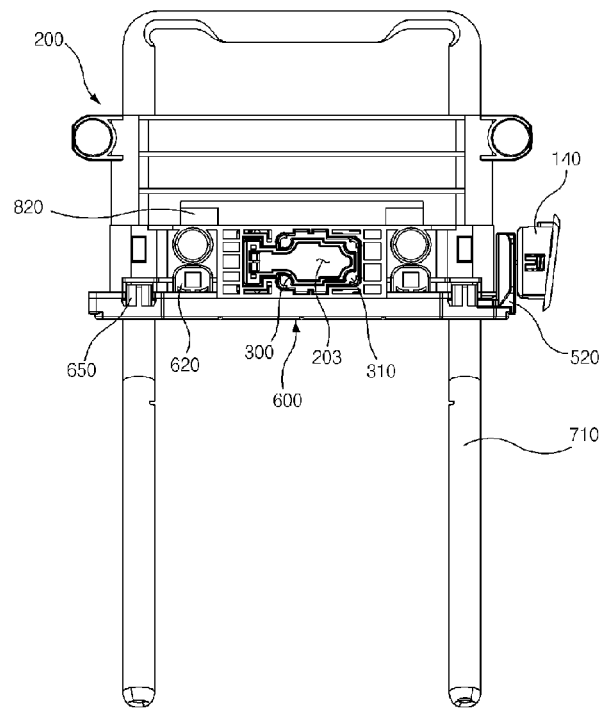
FIG. 19 is a front view of FIG. 18.
Figure 20:
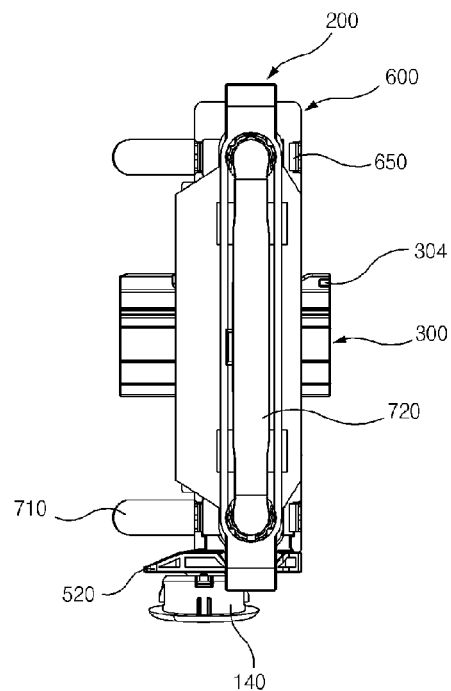
FIG. 20 is a plan view of FIG. 18.
Figure 21:
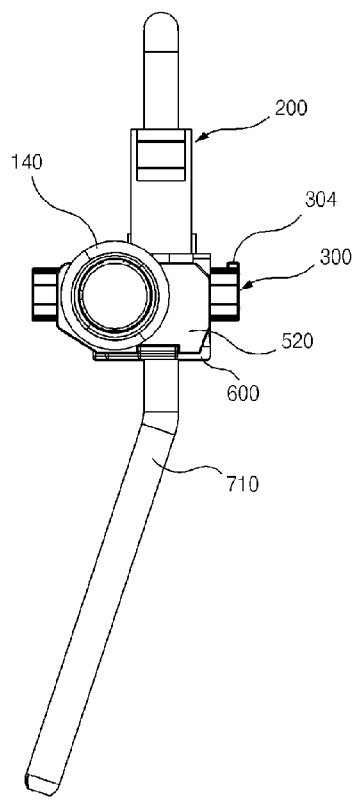
FIG. 21 is a side view of FIG. 18.
Figure 22:
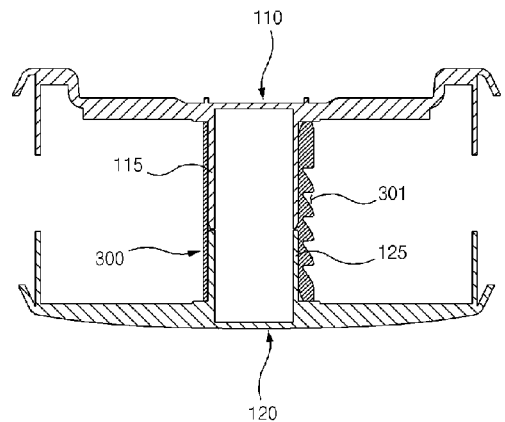
FIG. 22 is a horizontal cross-sectional view illustrating a state where a locking cover and a cover according to an exemplary embodiment of the present invention are coupled to each other.
Figure 23:
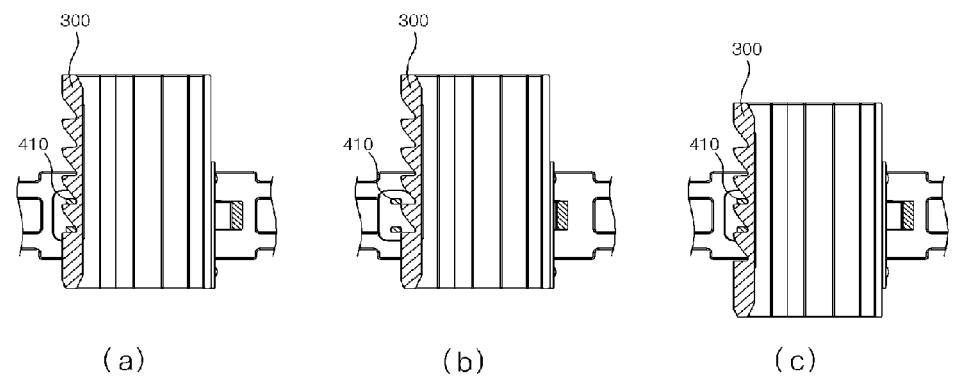
Figure 23:
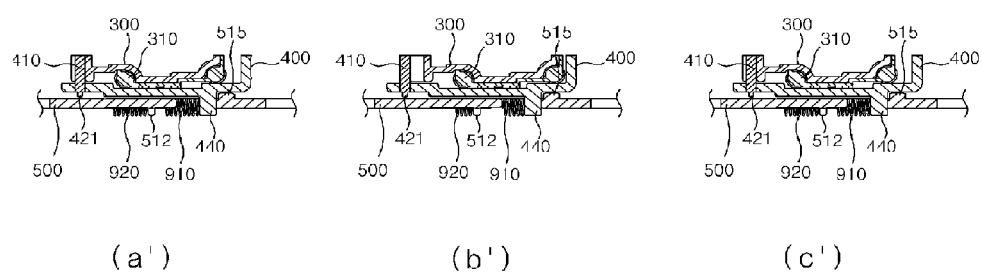

Alternatively, as illustrated in FIG. 15, the lower cover may not be provided and the button may be installed on a side surface of a front cover 110' or a rear cover 120'.

The button includes a button unit 160, the bezel unit 140 on which the button unit 160 is slidably installed, and a button return spring 150 configured to return the button unit 160.

The button unit 160 is fastened to the bezel unit 140 through a hook to be slidable in relation to the bezel unit 140.

The bezel unit 140 is formed with a seat recess 142 in which the button unit 160 is seated.

On an inner wall of the bezel unit 140, serrations 141 are formed. Each of the serrations 141 is formed to have a semicircular cross section. Accordingly, the bezel unit 140 and the button unit 160 are line-contacted with each other to reduce friction between the button unit 160 and the bezel unit 140. Thus, operating force required for pushing the button unit 160 is reduced and thus, the user's convenience may be improved.

In addition, an edge of a flange portion 143 surrounding the bezel unit 140 is formed to be rounded. As a result, since the user s finger contact portion is formed to be rounded, the user s contact feeling may be improved.

The button return spring 150 is fitted on a spring mounting rod formed inside the bezel unit 140.

The middle cover 200 is disposed inside the cover 100 between the front wall 111 and the rear wall 121 and is formed with a hollow portion 203.

The middle cover 200 includes a body 210 and a guide unit 220 formed on the body 210.

The body 210 is formed with a hollow portion 203 at the central portion thereof to extend in the forward/backward direction.

The body 210 is formed with a guide protrusion 213 disposed at a side within the hollow portion 203. The guide protrusion 213 is formed to extend in the forward/backward direction.

At the lower portion of the body 210, a lock pin plate insertion hole 206 is formed in the vertical direction to be communicated with the hollow portion 203.

The body 210 is formed with a lock pin plate guide hole 202 to be communication with the lock pin plate insertion hole 206 above the lock pin plate insertion hole 206.

At the opposite sides of the body 210, vertical portion passing holes 217 are formed in which the vertical portions 710 are inserted into the vertical portion passing holes 217, respectively.

The body 210 is formed with bushing fastening holes 216 to be communicated with the vertical portion passing holes 217.

At the opposite sides the front portion of the body 210, fastening protrusion passing holes 215 are formed and fastening hook insertion holes 214 are formed outside the fastening protrusion passing holes 215.

At the opposite sides of the body 210, guide holes 204 extending in the forward/backward direction are formed to be disposed between the hollow portion 203 and the vertical portion passing holes 217, respectively.

Through the forward/backward guide holes 204, the guide portions 119 and the forward/backward guide rods 129 are inserted.

In addition, at the rear portion of the body 210, bottom cover bolt-fastening portions 218 are formed to be disposed below the forward/backward guide holes 204. The bottom cover bolt-fastening portions 218 are formed with fastening grooves to which bolts may be fastened.

The body 210 is formed with bearing cover insertion grooves 219 at the top and bottom of the hollow portion 203 to be communicated with the hollow portion 203.

At the opposite sides of the bottom of the body 210, guide protrusions 211 are formed to be disposed inside the protrusion insertion holes 640 formed in the bottom cover 600 through the insertion holes 513 of the lock plate 500.

On the guide protrusions 211, third insulator members 830 are fitted.

Each of the third insulator members 830 is formed with a protrusion insertion hole 831 extending in the vertical direction in which the guide protrusions 211 are inserted into the protrusion insertion holes 831.

At the front and rear portions of each of the third insulator member 830, plate insertion recesses 832 extending in the leftward/rightward direction are formed, respectively.

At the front and rear portions of the top and bottom of each third insulator member 830, spacing protrusions 833 are formed to be disposed above and below the plate insertion recesses 832.

Due to the spacing protrusions 833, the third insulator members 830 are line-contacted with neighboring members, thereby minimizing friction areas. The third insulator members 830 serve as bumpers to reduce noise.

On the bottom of the body 210, two return spring support plates 212 are formed to be spaced apart from each other.

The guide unit 220 includes a front wall 221, a rear wall 222 disposed at the rear side to be spaced apart from the front wall 221, and side walls 223 disposed at the opposite sides of the front and rear walls 221 and 222, respectively.

On each of the front and rear walls 221 and 222 of the guide unit 220, ribs extending in the leftward/rightward direction are formed.

At the lower central portion of each of the front wall 221 and the rear wall 222, a cutout portion is formed.

Each of the side walls 223 of the guide unit 220 are formed be rounded in a circular arc shape when viewed in a horizontal cross-sectional view so as to form a bushing insertion hole 201. The bushing insertion holes 201 are communicated with the vertical portion passing holes 217.

At the upper outsides of the side walls 223, forward/backward guide pipes 224 are formed to protrude therefrom.

Each of the forward/backward guide pipes 224 are formed with a guide rod passing hole 205 extending in the forward/backward direction in which the forward/backward guide rods 113 and 123 pass through the guide rod passing holes 205.

The distance between the two guide rod passing holes 205 is longer than the distance between the two forward/backward guide holes 204 such that the headrest may be stably moved forward/backward in relation to the middle cover 200.

The bushing elements 840 are inserted into the bushing insertion holes 201 and the vertical portion passing holes 217.

Accordingly, the bushing elements 840 are disposed between the middle cover 200 and the vertical portions 710.

The bushing elements 840 are formed with stay rod passing holes 845 extending in the vertical direction through which the vertical portions 710 pass.

Each of the bushing elements 840 includes an upper section 840a disposed within the guide unit 220, a middle section 840b disposed within the body 210, and a lower section 840c disposed below the middle section 840b.

The upper section 840a is formed with a cutout portion 841 toward the inside. The cutout portion 841 is communicated with a space between the front wall and the rear wall of the guide unit 220.

Within bushing elements 840, a plurality of supporting projections 842 extend in the vertical direction so as to minimize the contact area with the vertical portions 710 while supporting the vertical portions 710 stably.

In addition, the middle section 840b is slit at the front and rear portions thereof to form elastic supporting pieces 843. The inner wall of each of the elastic supporting pieces 843 is formed to have a circular arc-shaped cross section when viewed in a vertical cross-section view.

The middle section 840b is slit at the front and rear portions thereof to form fastening hooks 844 to be inserted into the bushing fastening holes 216. Due to the fastening hooks 844, each of the bushing elements 840 may be installed in the middle cover 200 by one touch.

At the front top and bottom portions and the rear top and bottom portions of the inner wall of the middle section 840b, bent supporting protrusions are formed to protrude.

Take-out holes 847 extending in the leftward/rightward direction are formed at the opposite side of the lower section 840c, and lower slit portions 846 extending in the vertical direction are formed to be communicated with the take-out holes 847.

Due to the bushing elements 840, the middle cover 200 may be smoothly moved in the vertical direction in relation to the vertical portions 710 while reducing operating noise and friction.

The locking cover 300 is inserted into the hollow portion 203 and connected to the cover 100. On the locking cover 300, teeth 301 are formed in the forward/backward direction.

Thus, the locking cover 300 is provided to be capable of being separated from the front cover 110 so that the overall weight of the device may be reduced and the fastening force may be increased. For example, the cover 100 is made of HDPE and the locking cover 300 may be made of PA66 so that the materials of the cover 100 and the locking cover 300 may be different from each other. Due to the different materials, the weight of the device may be reduced. In addition, the number of fastening portions of the cover 100 may be increased to increase the fastening force.

The locking cover 300 is formed with a through-hole 302 extending in the forward/backward direction at the central portion thereof in which the locking cover connection portions 115 and 125 are inserted into the through-hole 302.

On the left portion of the locking cover 300, the teeth 301 are formed in the leftward/rightward direction.

The front surfaces of the teeth 301 are formed to be inclined and the rear surfaces are formed to be vertical.

On the top and bottom surfaces of the locking cover 300, guide recesses 303 are formed in which the guide protrusions 213 are inserted into the guide recesses 303.

On the top surface of the locking cover 300, a stopper 304 is formed to protrude at the rear end of the teeth 301. The stopper 304 is seated in the stopper seat recess formed at the rear portion of the middle cover 200 to be locked to the middle cover 200 so as to prevent the locking cover 300 from being moved over a predetermined distance in relation to the middle cover 200.

On the inner wall surface of the locking cover 300 which positionally corresponds to the portion formed with the teeth 301, a reinforcement rib 305 is formed.

The middle cover 200 is equipped with a ball bearing 320 to surround the locking cover 300. The ball bearing 320 is installed in the middle cover 200 through a bearing cover 310.

The front and rear sides of each of the top and bottom portions of the bearing cover 310 are formed with bearing insertion holes into which balls of the ball bearing 320 are inserted, respectively.

At a side of the bearing cover 310, a cut-out portion 313 is formed in the forward/backward direction.

The bearing cover 310 is formed with a locking cover passing hole 312 through which the locking cover 300 passes.

The bearing cover 310 is formed with insertion protrusions 311 on the top and bottom surfaces thereof in which the insertion protrusions 311 are inserted into the bearing cover insertion grooves 219. Due to the insertion protrusions 311, the bearing cover 310 is fixed to the middle cover 200.

Due to the ball bearing 320, the locking cover 300 may be smoothly moved in the forward/backward direction in relation to the middle cover 200.

The lock pin plate 400 is installed in the middle cover 200 to be slidable in the leftward/rightward direction and provided with a lock pin 410 which is engaged with the teeth 301.

The lock pin plate 400 includes a body 430 formed in a "⊃" shape to enclose the bearing cover 310, pin installation plate portions 420 formed at top and bottom ends of the body 430, and a linkage protrusion 440 formed on the bottom of the body 430 to protrude forwardly.

On the top of the body 430, a guide protrusion 431 is formed to be inserted into the guide hole 202.

The linkage protrusion 440 is formed with a return spring mounting protrusion 441 on which a first return spring 910 is fit to be directed to the inside.

The pin installation plate portions 420 are formed with insertions holes into which two pins are inserted.

At the lower pin installation plate portion 420, a guide protrusion 421 is formed in the forward/backward direction.

The lock pin 410 may be provided in the lock pin plate 400 through insert molding.

The lock plate 500 includes a body 510 formed in a horizontal plate shape and a pushing transfer portion 520 formed vertically at the right side of the body 510.

At the opposite side portions of the body 510, through-holes 501 are formed in which the vertical portions 710 of the stay rod 700 pass through the through-holes 501.

In addition, insert members 530 are inserted into the inside of the body 510 in which the insert members 530 are disposed adjacent to the through-holes 501 and inserted into the catching grooves 711 formed on the vertical portions 710.

The insert members 530 which are formed of a steel material are inserted into the body 510 through insert molding or assembling so as to fix the position of the headrest or support a downward load.

The leftward/rightward directional width of each of the through-holes 501 is larger than that of each of the vertical portions 710 so that the lock plate 500 may be moved in the leftward/rightward direction in relation to the vertical portions 710.

The body 510 is formed with insertion holes 513 into which the third insulator members 830 and the guide protrusions 211 are inserted.

The body 510 is formed with a linkage protrusion passing hole 511 through which the linkage protrusion 440 passes so that the lock plate 500 is connected to the lock pin plate 400.

The body 510 is formed with spring insertion holes 514 in which return springs 900 to be described below are disposed. One of the two spring insertion holes 514 is formed to be communicated with the linkage protrusion passing hole 511. On the bottom surface of the body 510, a spring mounting protrusion 512 is formed to be disposed between the two spring insertion holes 514 in which a second return spring 920 is fitted on the spring mounting protrusion 512.

On the top surface of the body 510, a supporting protrusion 515 is provided to support the lock pin plate 400.

The lock plate 500 is disposed below the middle cover 200, and a bottom cover 600 is coupled to the middle cover 200 to support the lock plate 500. Due to this, the lock plate 500 is installed on the middle cover 200 to be slidable leftward/rightward.

The bottom cover 600 is formed in a plate shape and disposed below the lock plate 500.

Along the front, rear and left edges of the bottom cover 600, a peripheral wall 630 is formed.

At the opposite side portions of the bottom cover 600, stay rod passing holes 610 are formed through which the vertical portions 710 pass.

At the front and rear portions of the bottom cover 600, fastening hooks 650 are formed in which the fastening hooks 650 are inserted into the fastening hook insertion holes 214.

At the front and rear portions of the bottom cover 600, fastening protrusions 620 are formed in which the fastening protrusions 620 are inserted into the fastening protrusion passing holes 215.

On the top surfaces of the bottom cover 600, first seat recesses in which the third insulator members 830 are seated and protrusion insertion holes 640 into which the guide protrusions 211 are inserted are formed.

On the top surfaces of the bottom cover 600, a second seat recess 660 in which the return springs 900 and the linkage protrusion 440 are seated is formed.

The return springs 900 includes a first return spring 910 configured to return the lock pin plate 400 and a second return spring 920 configured to return the lock plate 500.

The button is disposed outside the pushing transfer portion 520 to move the lock plate 500 leftward/rightward.

A process of assembling the headrest moving device will be described.

The middle cover 200 is overturned and the stay rod 700 is inserted into the vertical portion passing holes 217 of the middle cover 200. Then, the bushing elements 840 are assembled to be fitted on the stay rod 700 and the lock pin plate 400 is inserted into the lock pin plate insertion hole 206. Then, the lock plate 500 is laid on the overturned middle cover 200 and the return springs 900 are fit on the spring mounting protrusions 441. Then, on the overturned middle cover 200, the bottom cover 600 is laid on the lock plate 500 and then the bottom cover 600 is pressed so that the fastening hooks 650 are inserted into the fastening hook insertion holes 214 and the bottom cover 600 is fixed to the middle cover 200.

Then, the ball bearing cover 310 assembled with the ball bearing 320 inserted into the hollow portion 203 and the locking cover 300 is inserted into the ball bearing cover 310.

The first insulator members 810 are seated in the seat recesses 112 and 122 of the front cover 110, the rear cover 120 and the middle cover 200 are positioned between the front cover 110 and the rear cover 120, then the coupling hooks 118 are inserted into the hook fastening holes 128 to be preassembled, and then bolts are fastened so as to integrate the front cover 110 and the rear cover 120.

Subsequently, a cushion (not illustrated) is fit on the top portions of the front, rear and side portions of the cover 100 and fit a covering member on the cushion member. Then, the lower cover 130 is assembled to the button, and then the fastening hooks 138 and 135 are fastened to the hook fastening holes of the lower cover 130 so that the lower cover 130 is assembled to the front cover 110 and the rear cover 120. Then, the assembly of the headrest is completed.

Hereinafter, a functional action of the exemplary embodiment configured as described above will be described.

When it is desired to adjust a forward/backward position or an upward/downward position of the headrest, the user pushes the button unit 160 of the button. Then, the pushing force is transferred to the pushing transfer portion so that the lock plate 500 is moved leftward as illustrated in FIGS. 23b and 23b' and FIG. 25b.

As a result, as illustrated in FIG. 25b, the lock plate 500, which has been inserted into the catching grooves 711 of the stay rod 700, is released from the catching grooves 711 so that the middle cover 200 and the cover 100 may be moved vertically in relation to the stay rod 700. That is, the headrest may be moved vertically.

In addition, as the lock plate 500 is moved leftward, as illustrated in FIGS. 23b and 23b', the lock pin plate 400 is also moved leftward. Due to this, the locking pin 410, which has been engaged with the teeth 301, is released from the teeth 301. Accordingly, locking is released such that the locking cover 300 and the cover 100 become movable forward/backward in relation to the middle cover 200. That is, the headrest becomes movable forward/backward.

When the teeth 301 of the locking cover 300 and the catching grooves 711 of the stay rod 700 are formed in a " ⊏ " shape, the button should be pushed whenever moving the headrest either in the forward/backward direction or in the upward/downward direction. When the teeth 301 and the grooves 711 are formed to be inclined at one side thereof as in the present invention, the forward movement and the upward movement are not locked. Thus, when moving the headrest forward or upward, the user may move the headrest by moving the headrest forward or upward (applying external force forward or upward) without pushing the button. However, since the backward movement and the downward movement are locked, the headrest may be moved backward or downward only when the button is pushed while moving the headrest backward or downward.

In this manner, the locking of the backward movement and the locking of the downward movement of the headrest are simultaneously released through one pushing operation of the button unit 160. Thus, according to the operation of moving the headrest forward/backward or upward/downward, the position of the headrest is adjusted. As a result, the user's convenience may be improved.

Figure 24:
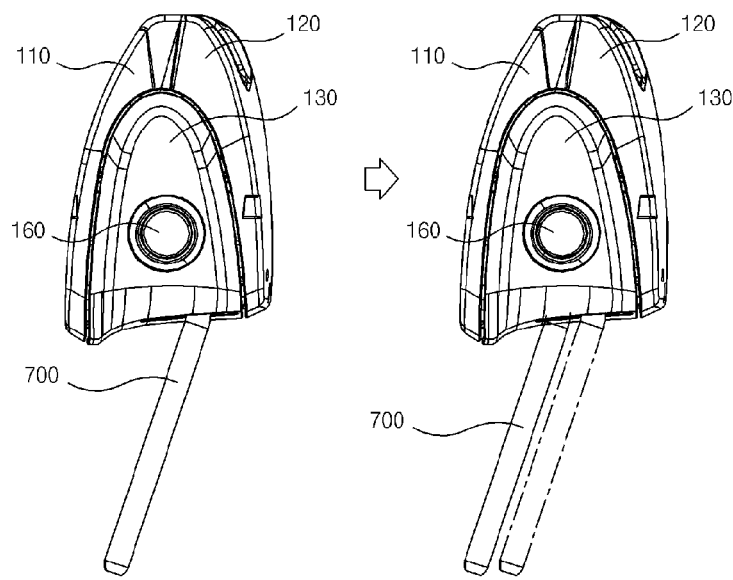
FIG. 24 is a view illustrating a state where a headrest moving device according to an exemplary embodiment of the present invention is moved forward/backward.
Figure 25:
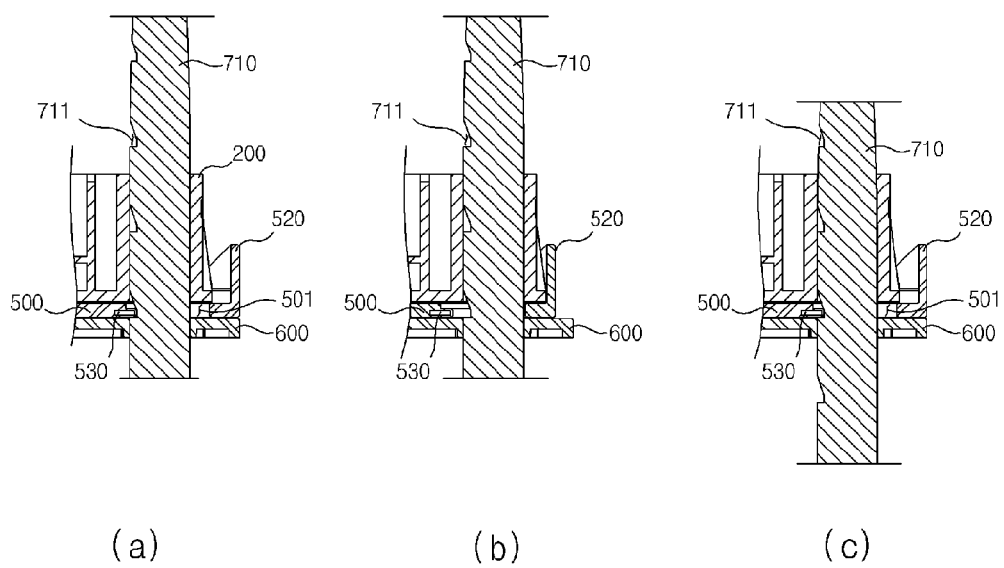

Meanwhile, when the headrest is moved forward/backward, the front cover 110 and the rear cover 120 are integrally moved forward/backward in relation to the stay rod 700 as illustrated in FIG. 24. As a result, the gap and play of the device may be minimized. Further, since the device is simple in construction, the assemblability may be improved and the manufacturing costs may be reduced.

When the user removes the force of pushing the button unit 160, the lock pin plate 400 and the lock plate 500 may be moved rightward and returned to the original positions thereof as illustrated in FIGS. 23c and 23c' and FIG. 25c by the elastic force of the return springs 900. Due to this, as illustrated in FIG. 25c, the lock plate 500 is caught by the catching grooves 711 so that the vertical position of the headrest is locked and, as illustrated in FIGS. 23c and 23c', the lock pin 410 is engaged with the teeth 301 so that the forward/backward position of the headrest is locked.

Although the exemplary embodiments of the present invention have been described above, a person ordinarily skilled in the art may variously modify or change the present invention without departing from the idea and scope of the present invention defined in the claims.

DESCRIPTION OF REFERENCE NUMERALS

100: cover, 110: front cover
111: front wall, 120: rear cover
121: rear wall, 130: lower cover
140: bezel unit, 141: serrations
150: button return spring, 160: button unit
200: middle cover, 203: hollow portion
300: locking cover, 301: teeth
310: bearing cover, 320: ball bearing
400: lock pin plate, 410: lock pin
500: lock plate, 501: through-hole
600: bottom cover, 700: stay rod
710: vertical portion
720: horizontal portion, 711: catching groove, 810: first insulator member
830: third insulator member
840: bushing element, 900: return spring

The invention claimed is:

1. A headrest moving device comprising:
a cover including a front wall and a rear wall;
a middle cover disposed inside the cover and formed with a hollow portion;
a locking cover inserted into the hollow portion, connected to the cover, and formed with teeth along a forward/backward direction thereof, wherein the middle cover is provided with a ball bearing such that the ball bearing encloses the locking cover;
a lock pin plate installed on the middle cover to be slidable in a leftward/rightward direction and provided with a lock pin inserted into the teeth;
a lock plate formed with through-holes through which vertical portions of a stay rod pass, the lock plate being installed on the middle cover to be slidable in the leftward/rightward direction and being connected to the lock pin plate;
a return spring configured to return the lock plate or the lock pin plate to original position where a vertical position of the headrest is locked or a forward/backward position of the headrest is locked; and
a button configured to move the lock plate in the leftward/rightward direction, wherein the cover includes a front cover and a rear cover disposed at a rear side of the front cover and the front cover is fixed to the rear cover so that the spacing between the front wall and the rear wall may be maintained constantly.

2. The headrest moving device of claim 1, wherein the button includes a button unit and a bezel unit in which the button unit is slidably mounted.

3. The headrest moving device of claim 2, wherein the middle cover is formed with vertical portion passing holes into which the vertical portions are inserted, and
bushing elements are inserted into the vertical portion passing holes such that the bushing elements are disposed between the middle cover and the vertical portions.

4. The headrest moving device of claim 2, wherein at a lower portion of the middle cover, a lock pin plate insertion hole is formed, the lock pin plate being inserted into the lock pin plate insertion hole and the lock pin plate insertion hole being communicated with the hollow portion,
wherein the lock pin plate is formed with a linkage protrusion,
wherein the lock plate is formed with a lock protrusion passing hole through which the linkage protrusion passes, and
wherein a bottom cover configured to support the lock plate is mounted on the middle cover.

5. The headrest moving device of claim 1, wherein the middle cover is formed with vertical portion passing holes into which the vertical portions are inserted, and
bushing elements are inserted into the vertical portion passing holes such that the bushing elements are disposed between the middle cover and the vertical portions.

6. The headrest moving device of claim 5, wherein the button includes a button unit and a bezel unit in which the button unit is slidably mounted.

7. The headrest moving device of claim 5, wherein at a lower portion of the middle cover, a lock pin plate insertion hole is formed, the lock pin plate being inserted into the lock pin plate insertion hole and the lock pin plate insertion hole being communicated with the hollow portion,
wherein the lock pin plate is formed with a linkage protrusion,
wherein the lock plate is formed with a lock protrusion passing hole through which the linkage protrusion passes, and
wherein a bottom cover configured to support the lock plate is mounted on the middle cover.

8. The headrest moving device of claim 1, wherein at a lower portion of the middle cover, a lock pin plate insertion hole is formed, the lock pin plate being inserted into the lock pin plate insertion hole and the lock pin plate insertion hole being communicated with the hollow portion,
wherein the lock pin plate is formed with a linkage protrusion,
wherein the lock plate is formed with a lock protrusion passing hole through which the linkage protrusion passes, and
wherein a bottom cover configured to support the lock plate is mounted on the middle cover.

9. The headrest moving device of claim 8, wherein the button includes a button unit and a bezel unit in which the button unit is slidably mounted.

10. The headrest moving device of claim 8, wherein the middle cover is formed with vertical portion passing holes into which the vertical portions are inserted, and
bushing elements are inserted into the vertical portion passing holes such that the bushing elements are disposed between the middle cover and the vertical portions.

11. A headrest moving device comprising:

a cover including a front wall and a rear wall;

a middle cover disposed inside the cover and formed with a hollow portion;

a locking cover inserted into the hollow portion, connected to the cover, and formed with teeth along a forward/backward direction thereof;

a lock pin plate installed on the middle cover to be slidable in a leftward/rightward direction and provided with a lock pin inserted into the teeth, wherein the lock pin plate is formed with a linkage protrusion;

a lock plate formed with through-holes through which vertical portions of a stay rod pass, the lock plate being installed on the middle cover to be slidable in the leftward/rightward direction and being connected to the lock pin plate, wherein the lock plate is formed with a lock protrusion passing hole through which the linkage protrusion passes;

a lock pin plate insertion hole formed at a lower portion of the middle cover, the lock pin plate being inserted into the lock pin plate insertion hole and the lock pin plate insertion hole being communicated with the hollow portion;

a bottom cover, configured to support the lock plate, mounted on the middle cover;

a return spring configured to return the lock plate or the lock pin plate to original position where a vertical position of the headrest is locked or a forward/backward position of the headrest is locked; and a button configured to move the lock plate in the leftward/rightward direction, wherein the cover includes a front cover and a rear cover disposed at a rear side of the front cover and the front cover is fixed to the rear cover so that the spacing between the front wall and the rear wall may be maintained constantly.

* * * * *